Figure 1:
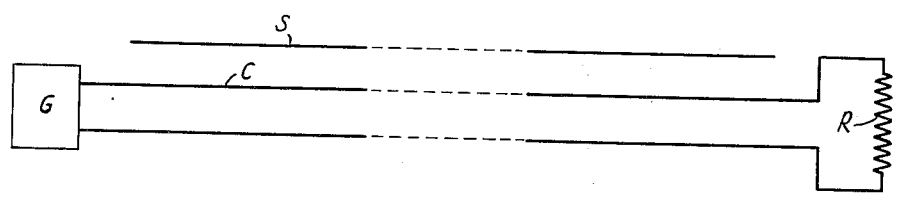

May 9, 1939.  A. D. BLUMLEIN  2,157,522
ELECTRIC SIGNAL TRANSMISSION LINE
Filed Jan. 30, 1937

INVENTOR
ALAN DOWER BLUMLEIN
BY
ATTORNEY

Patented May 9, 1939

2,157,522

UNITED STATES PATENT OFFICE 2,157,522

ELECTRIC SIGNAL TRANSMISSION LINE

Alan Dower Blumlein, Ealing, London, England, assignor to Electric & Musical Industries, Ltd., Hayes, Middlesex, England, a corporation of Great Britain Application January 30, 1937, Serial No. 123,100
In Great Britain February 13, 1936

7 Claims. (Cl. 179—78)

The present invention relates to electric signal transmission lines.

In an electric signal transmission line comprising two conductors one of which is earthy, either due to connection to earth, or due to large capacity to earth, trouble arises from interference, either from power systems or from similar circuits. A typical example of such a case is a co-axial cable for transmission up to very high frequencies.

In such a cable the inner conductor has substantially no direct capacity to earth, whereas the outer conductor is either earthed conductively, or effectively earthed through the capacity of the condenser formed by any insulation between the outer conductor and earth. In this type of cable however, the distance between amplifiers is usually short and may not be more than 10–15 miles. At low frequencies where interference from power systems is most troublesome, the section of cable between adjacent amplifiers is electrically short, both because of the short physical length of the section, and also due to the high natural velocity of the cable, this velocity being of the order of the velocity of light. For example, a cable section some 10 miles long will be shorter than an eighth of a wavelength at frequencies below say 1500 to 2000 cycles per second.

It is the object of the present invention to provide terminal equipment associated with a cable, the arrangement being such that advantage is taken of this electrical shortness to reduce the interference experienced when operating the cable.

According to the present invention, in a system of signal transmission employing a concentric cable, reduction of electrical interference of relatively low frequency is effected by providing between the conductors at the transmitting end of the cable an impedance which is high compared with the surge impedance of the cable.

The receiving end of the cable may in certain circumstances be terminated by an impedance which is of the same order as that of the surge impedance of the cable. In a particular system according to the invention the cable is a section which is electrically short within the range of interference frequencies to be reduced, such frequencies having a range up to about 1000 cycles per second and such a cable section may for example be less than one eighth of a wavelength within the range of interference frequencies.

At the transmitting end the cable may be coupled to the anode of a thermionic valve having an impedance which is high compared with the surge impedance of the cable, the coupling being such that at least the alternating components of the signals to be transmitted are fed to the cable. Conveniently a valve of the tetrode or of the pentode type may be employed, the anode of the valve being coupled to the central conductor of the concentric cable through a relatively large condenser.

Figure 2:
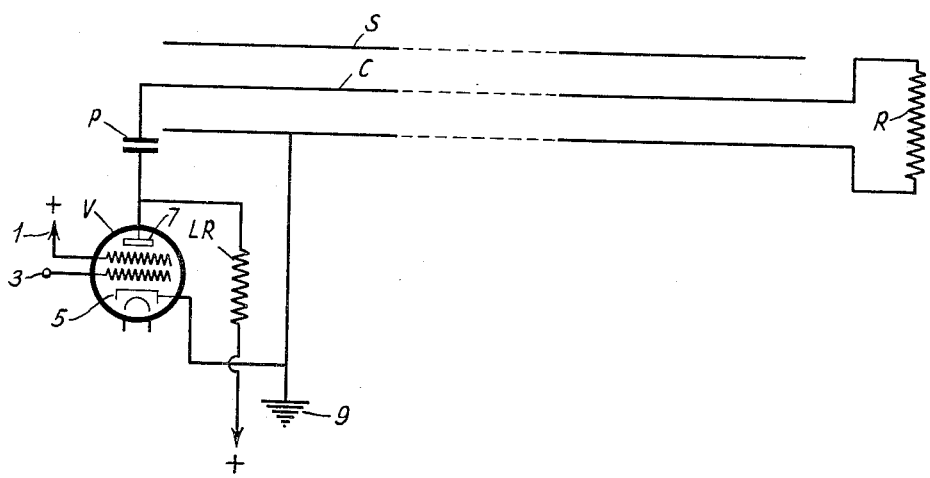

In order that the invention may be more clearly understood and readily carried into effect, reference will now be made to the accompanying drawing in which:

Fig. 1 is an explanatory diagram and
Fig. 2 shows an example of a method of connecting a cable in accordance with the invention.

Referring to Fig. 1 of the drawing, a length of concentric cable is shown supplied from a signal generator G which is connected between the central conductor C and the outer conducting sheath S. The impedance of the generator G is arranged to be high compared with the surge impedance of the cable and at the receiving end of the cable the terminating resistance represented by resistance R is given a value which is of the same order as that of the surge impedance of the cable.

In Fig. 2 of the drawing a high impedance tetrode valve V is shown as a signal generator, the anode 7 of the valve being connected through a condenser P of the order of 10 mfds. to the conductor C. The valve V is provided with a load resistance LR of the order of 10,000 ohms, and the outer sheath S of the cable is connected to the cathode 5 of the valve. The shield electrode 11 is connected to a positive voltage and signal voltage applied between the control electrode 3 and the cathode 5, which is maintained at ground potential 9.

It will be seen that the cable is effectively terminated at the transmitting end by a high valve impedance and a high load resistance in parallel with one another. It is arranged that these provide a sending terminal impedance very much larger than the characteristic impedance of the cable. At the receiving end the cable is terminated by an impedance of the same order of magnitude as the characteristic impedance of the cable, the requisite resistance being provided by a resistance R, which may be for example 80 ohms.

At frequencies at which the cable is electrically short, power interference operates by causing current to flow in the outer or earthy conductor of the cable, thus causing a resistive potential drop in this conductor. This resistive potential drop is the disturbing E. M. F. in the circuit and causes current to flow in a looped circuit comprising the earthy conductor, the impedance of the receiving terminal (receiving impedance), the resistance of the non-earthy conductor and the impedance from which it is fed at the sending terminal (sending impedance). Since the sending impedance is very much larger than the receiving impedance, then a much greater proportion of the interference voltage appears across the sending impedance than appears across the receiving impedance, with the result that the interfering voltage across the receiving impedance is greatly reduced.

In the example given the valve anode impedance may be 50,000 ohms which is in parallel with a 10,000 ohms feed resistance giving a sending impedance of 8300 ohms. The terminating impedance may be 80 ohms so that approximately only one hundredth of the interfering voltage appears at the receiving end. The method of operation described above depends on the shunting effect of the cable capacity being small, and this will be the case if the cable is electrically short, as for example when $jl$ equal to or less than $$\frac{\pi}{4}$$

where $j$ is the magnitude of the propagation constant and $l$ is the length of the cable.

The cable is preferably terminated by its urge impedance, but this is not necessary in order to obtain the reduction of noise to signal ratio provided by the method described. If the terminating resistance is larger than the surge impedance then the noise will be greater, but so also will the signal. In practice however, in order to prevent undesirable reflections, the terminating resistance at the receiving end is preferably made equal to high frequency surge impedance of the cable.

Other methods of coupling are available such as transformer coupling provided the transformer presents a high impedance to the cable within the range of interfering frequencies to be reduced.

If the cable is not required for as long a distance as 10 or 15 miles, but for a much shorter distance, this system of feeding and receiving will reduce the noise up to yet higher frequencies, so that for very short distances such as a mile, the noise may be reduced effectively at all frequencies below say 10,000 cycles per second. Above this frequency the thickness of the outer conductor of a co-axial cable will effectively held to shield the cable from interference. If, however, the outer conductor is not sufficiently thick, this shielding action may be increased by an application of iron tape binding and, if necessary, a further outer conductor, to provide in well known manner an efficient shield as shown for example in the article entitled "Wide band transmission over coaxial lines" by Epensheid and Strieby, in the Bell Systems Technical Journal for October, 1934. If however the noise at the lower frequencies is reduced in the manner of this invention, the thickness of iron binding or other auxiliary shield required, can be materially reduced as compared with what would have been required if the cable had been fed from an impedance equal to its surge impedance.

Having described my invention, what I claim is:

1. In a signal transmission system employing a coaxial cable having a transmitting end and a receiving end terminated in an invariant impedance whose value is substantially equal to the surge impedance of the cable, the method of reducing electrical interference of energy components below a predetermined frequency, which comprises the step of supplying signals to the cable at the transmitting end through an invariant impedance whose value at the predetermined frequency is high compared to the surge impedance of the cable.

2. In a signal transmission system employing a coaxial cable having a transmitting end and a receiving end, the method of reducing electrical interference of energy components below a predetermined frequency, which comprises the steps of terminating the receiving end of the cable in an invariant impedance whose value is of the same order as the surge impedance of the cable, and terminating the transmitting end of the cable in an impedance whose value is large at the predetermined frequency compared to the surge impedance of the cable.

3. In a signal transmission system employing a coaxial cable having a transmitting end and receiving end, the method of reducing electrical interference of energy components below a thousand cycles per second, which comprises the steps of terminating the receiving end of the cable in an invariant impedance whose value is substantially equal to the surge impedance of the cable, and terminating the transmitting end of the cable in an impedance whose value is large at 1000 cycles per second compared to the surge impedance of the cable.

4. A transmission system comprising a coaxial cable having a receiving end and a transmitting end, a terminating impedance at the receiving end whose value is substantially equal to the surge impedance of the cable and independent of frequency, and means including a terminating impedance for the transmitting end to reduce electrical interference of energy components below a predetermined frequency, said impedance having a value at the predetermined frequency which is large compared to the surge impedance of the cable.

5. A transmission system comprising a coaxial cable having a receiving end and a transmitting end, a terminating impedance at the receving end, said terminating impedance being of the same order as the surge impedance of the cable and independent of frequency, and means including a terminating impedance for the transmitting end to reduce electrical interference of energy components below a predetermined frequency, said impedance having a value at the predetermined frequency which is large compared to the surge impedance of the cable.

6. A transmitting system comprising a thermionic tube having a resistance-capacity output circuit, a coaxial cable electrically short compared to a predetermined frequency, and having a receiving end and a transmitting end, means to couple the output circuit of the thermionic tube to the transmitting end of the cable, and means to terminate the cable at the receiving end with an impedance whose value is of the same order as the surge impedance of the cable and independent of frequency, said output circuit of the thermionic tube having a large impedance at the predetermined frequency.

7. A signal transmission system comprising a thermionic valve having an anode, a concentric cable having a transmitting end and a receiving end, means including a high impedance to couple the transmitting end of the cable to the anode of the thermionic valve, and to pass at least the alternating current components of the signal to be transmitted to the cable, and a terminating impedance at the receiving end of the cable whose value is substantially equal to the surge impedance of the cable and independent of frequency.

ALAN DOWER BLUMLEIN.